(12) United States Patent
Han et al.

(10) Patent No.: US 7,038,880 B2
(45) Date of Patent: May 2, 2006

(54) METHOD TO MAKE A PLANAR WRITER WITH LOW D.C. COIL RESISTANCE

(75) Inventors: Cherng-Chyi Han, San Jose, CA (US); Danning Yang, Fremont, CA (US); Mao-Min Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 290 days.

(21) Appl. No.: 10/633,132

(22) Filed: Aug. 1, 2003

(65) Prior Publication Data

US 2005/0024765 A1 Feb. 3, 2005

(51) Int. Cl.
*G11B 5/147* (2006.01)

(52) U.S. Cl. ............................................. 360/123
(58) Field of Classification Search ............... None
See application file for complete search history.

(56) References Cited

U.S. PATENT DOCUMENTS

| 6,178,070 B1 | 1/2001 | Hong et al. ............... 360/317 |
|---|---|---|
| 6,333,830 B1 * | 12/2001 | Rose et al. ................ 360/123 |
| 6,339,523 B1 | 1/2002 | Santini ..................... 360/317 |
| 6,356,410 B1 | 3/2002 | Chesnutt et al. .......... 360/126 |
| 6,400,526 B1 | 6/2002 | Crue, Jr. et al. .......... 360/126 |
| 6,525,901 B1 * | 2/2003 | Kamijima et al. ........ 360/123 |
| 6,693,769 B1 * | 2/2004 | Hsu et al. ................. 360/126 |

* cited by examiner

*Primary Examiner*—William Korzuch
*Assistant Examiner*—Mark Blouin
(74) *Attorney, Agent, or Firm*—George O. Saile; Stephen B. Ackerman

(57) ABSTRACT

An inductive-type write head and its method of fabrication are disclosed. The write head has a vertically separated two-element planar coil of reduced resistance which is the result of forming the lower of the two coils with windings of a greater height and substantially larger cross-sectional area than those of the upper coil. The formation of a lower coil with greater height is possible because of a surface planarization that allows separating the coils by an alumina layer of minimal thickness. This method allows the reduction of coil resistance without the necessity of enlarging the head dimensions. The reduced resistance results in lower power consumption and the elimination of pole tip protrusion caused by excessive heating during operation.

7 Claims, 6 Drawing Sheets

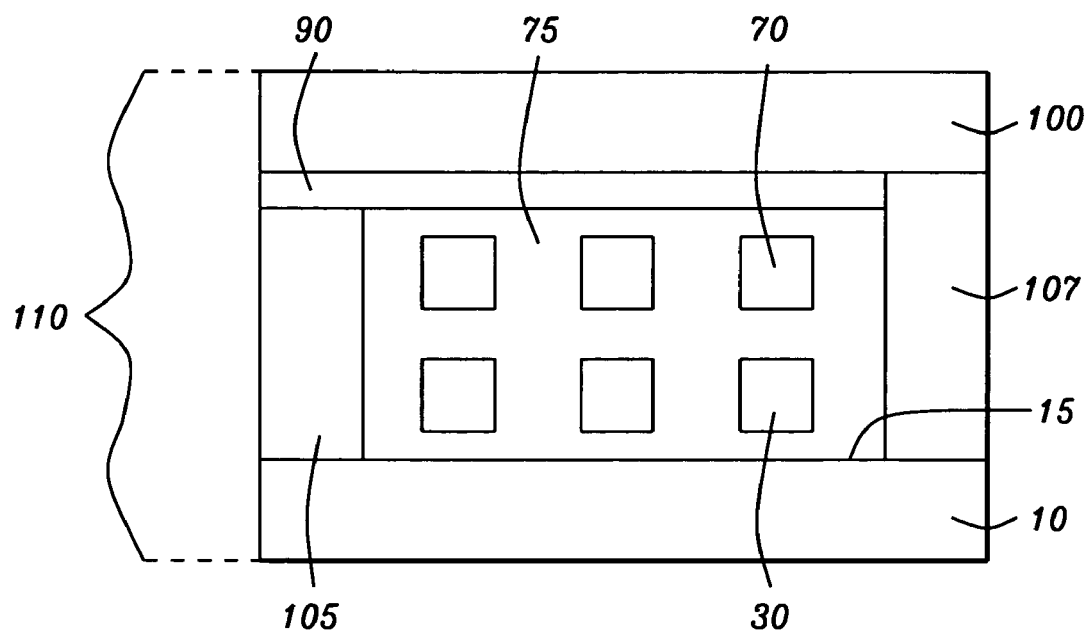
FIG. 1 – Prior Art
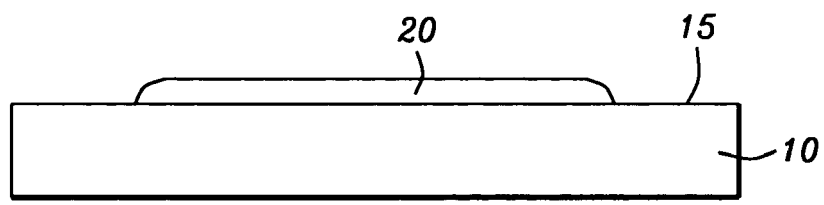
FIG. 2
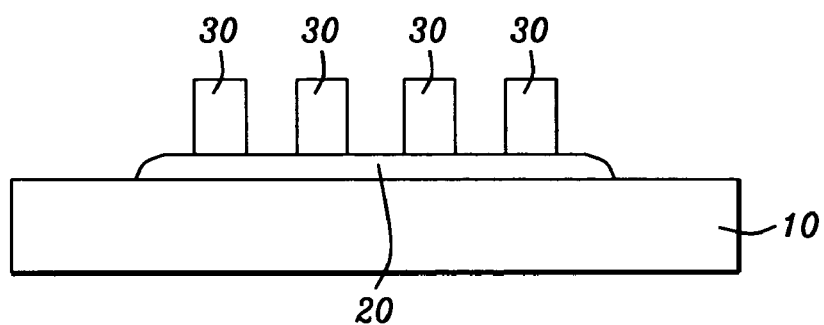
FIG. 3

METHOD TO MAKE A PLANAR WRITER WITH LOW D.C. COIL RESISTANCE

BACKGROUND OF THE INVENTION

1. Field of the Invention

This invention relates to thin film magnetic write head fabrication, in particular to the fabrication of such a write head that minimizes thermal pole-tip protrusion with a coil configuration that provides low power consumption for a given yoke length.

2. Description of the Related Art

Thin film induction-type magnetic write heads are used to encode magnetically stored information on moving magnetic media such as tapes and discs. In the simplest terms, such a head consists of two pole pieces separated at the air-bearing surface (ABS) by a narrow gap (the write gap) and yoked together behind the ABS to form an approximately horseshoe-shaped assembly. A conductive coil is patterned between the pole pieces which, when electrically energized, induces a magnetic field between the poles that fringes across the gap. It is this induced field that encodes small magnetic regions in the moving medium. In the most general terms, the performance of such a write head is related to its magneto-motive force (MMF), which is itself proportional to the product of the current in the coil and the number of coil turns. To improve write head performance, therefore, either the current or the number of coil turns (or both) must be increased. On the other hand, the power consumption and, therefore, the Joule heating of the head is proportional to $I^2R$ (current squared times coil resistance). If write head performance is to be improved by increasing the current, there will be a large corresponding increase in heating and the problem of thermal protrusion of the pole tip. Thermal tip protrusion is a major problem since the write head must be positioned increasingly close to the medium surface as written densities become greater. The challenge in writer design, therefore, is how to make a writer with a greater number of coil turns, while keeping the total coil resistance low and maintaining the same length of the yoke.

Chesnutt et al. (U.S. Pat. No. 6,356,410) teach a write head formation wherein an upper pole tip is formed on a write gap which is on a lower pole tip, and the upper pole tip comprises two layers, the lower of which is narrower than the upper. A schematic diagram of the write head also discloses a double layer of coils, formed one above the other and positioned above the upper pole tip and write gap.

Crue, Jr., et al. (U.S. Pat. No. 6,400,526) provide a write head and an associated preamplifier chip wherein the impedances of the two are matched to allow closer placement of the chip to the write head. The write head incorporates a write gap layer that separates the first pole pedestal (on the lower pole) from the second pole tip portion (on the upper pole) at the air-bearing surface (ABS) and then extends from the ABS to the back gap of the yoke formation. The write gap also separates the turns of the first coil layer from those of the second coil layer. It is noted that this configuration makes for a shorter yoke length and reduced flux rise time.

Santini (U.S. Pat. No. 6,339,523) teaches a method of constructing a merged read/write head wherein the write head is constructed before the read head. This reversed order of construction eliminates some problems associated with prior art merged read/write heads such as write gap curvature, damage to read element during fabrication of the write element and shorting of lead layer to shield layer.

Hong et al. (U.S. Pat. No. 6,178,070) teaches a method of forming more coils in a write head (as many as three layers) without the necessity of increasing the yoke height. The method involves forming a first coil layer within a first insulation layer between the upper and lower pole pieces. In the prior art write head, the first coil layer is formed on an upper surface of this first insulation layer, rather than within it.

With the exception of the method of Hong et al., cited above, the prior art does not teach specifically a method of improving the magneto-motive force of a write head while retaining its general structure and dimensions. Hong et al. address the problem by forming more coils within the body of the head. The present invention will treat the problem by retaining the same number of coils and a two coil structure, but will decrease the resistance of the coils and thereby allow a decrease in the power consumption and Joule heating of the write head.

SUMMARY OF THE INVENTION

The first object of this invention is to provide a write head with reduced power consumption and a corresponding reduction in thermal tip protrusion, while not sacrificing the magnetomotive force required to write data at high densities.

The second object of this invention is to provide such a write head without sacrificing space within the write head structure and to maintain, thereby, a small size.

The third object of the present invention is to provide a method of forming such a write head.

These objects will be achieved by the construction of a write head having two connected planar coil layers wherein each coil layer lies in a horizontal plane, the planes being separated vertically, situated between the lower and upper poles of a write head having a substantially rectangular cross-section. The coils are insulated from each other and reside below the plane of the write gap layer, which separates the lower pole from the upper pole. The cross-sectional area of the lower coil windings is substantially greater than that of the upper windings, thereby providing a reduction in coil resistance and the desired reduction in power consumption while not increasing the size of the write head or sacrificing its magnetomotive force. A critical and novel feature of the method is the chemical-mechanical polishing (CMP) of the upper surface of the lower coil and insulation layer in which it is embedded to form a common planar surface within which the upper surface of the coil is exposed. This planarization permits the windings of that lower coil to be substantially taller while still providing an advantageous planar surface on which to form an thin alumina patch layer for the second coil layer formation. Thus, the second layer can be formed without the necessity of interspersing additional, space-wasting insulating layers between the two coil layers. It is further understood that the methods of the present invention are directed to forming a lower resistance coil while maintaining the dimensions of the write head and the overall magnetomotive force of the coil (ie. the same number of turns). In the following discussion, particular coil dimensions will be given, but these are exemplary and only serve to indicate the increase in lower coil cross-sectional dimensions.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 1 shows a prior art write head of a type to which the methods of the present invention can be applied. It is furnished to allow a definition of the pertinent parts of such a write head.

FIG. 2 schematically shows the formation of a planar substrate with an alumina patch on which to form a first layer of coil windings using the methods of the present invention.

FIG. 3 shows a schematic cross-sectional view of the first coil layer subsequent to its formation.

DESCRIPTION OF THE PREFERRED EMBODIMENT

Figure 4:
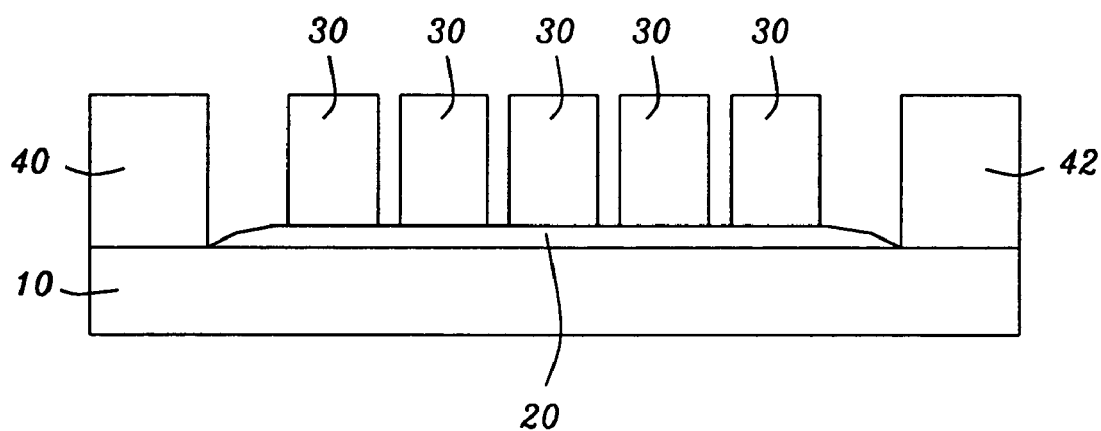
FIG. 4 shows, schematically, the formation of front and back pole pieces within which the first coil layer is situated.

The preferred embodiment teaches a method of forming an inductive write head having two connected planar coil layers and a reduced coil resistance resulting from the greater height and resultant greater cross-sectional area of the lower coil windings. The coil layers are formed in horizontal planes, vertically separated, and insulated from each other by a minimal thickness of insulation and connected through vias (not shown) that pass between the insulating layers. The methods of the present invention are generally applicable and will allow the fabrication of a write head having the same height and width dimensions and total coil length, yet a smaller coil resistance.

Referring first to FIG. 1, there is shown, schematically, a prior art write head of the type whose performance is materially improved by the methods of the present invention, together with a brief description of its pertinent components to simplify the identification of the components of the present invention. There is shown a substrate/lower magnetic pole (10) having a planar upper surface (15). The substrate is, generally, a formation that both separates and shields the write head from a read head below it and has formed on it a lower magnetic pole piece for the write head. A multi-layer pole tip (105) is formed on the front portion of the lower magnetic pole. A back-gap element (107), of substantially the same height as the pole tip, is formed on the rear portion of the lower magnetic pole. An upper pole piece (100) is formed on the back-gap and extends horizontally and substantially parallel to the lower pole piece to terminate over the pole tip. The front edges of the upper pole piece, the lower pole piece and the pole tip form a common vertical plane (10) which is the air-bearing surface (ABS) of the writer. A narrow write gap layer (90) separates the upper pole piece from the pole tip and opens into the ABS plane. The lower pole piece, the pole tip and the back-gap, together, form a continuous physical and magnetic connection that contains the magnetic flux produced by the inductive coils (30) and (70) whose cross-sections have substantially the same area and which are embedded in insulation (75). When the coils are energized, the magnetic flux fringes across the write gap and magnetizes moving storage media. A conducting coil (30) and (70), is formed in two connected, vertically displaced horizontal planar elements and is substantially contained within the lower pole piece, pole tip and back-gap regions. Both coil elements are situated below the write gap layer. In this prior art design, the cross-sectional area of the upper and lower coil windings is substantially the same and the resistance of the coils results in power dissipation that has disadvantageous thermal effects on the writer. In the subsequent figures, the method of the present invention will form a write head of similar basic design, but with a lower coil element having a substantially lower resistance than the upper element.

Referring now to FIG. 2, there is shown the initial steps of the formation of a write head using the method of the present invention in which the resistance of the lower coil element is substantially reduced by increasing the cross-sectional area of its windings. The upper surface (15) of the lower pole (10) is rendered planar by the planarization process of chemical/mechanical polishing (CMP). The planar surface is required to allow the formation of a coil element having closely pitched (ie., narrowly spaced) windings, which is necessary to produce the strong magnetic fields required for high surface density writing on magnetic media.

A first alumina patch layer (20) has been formed on the lower pole to a thickness between approximately 1000 and 3000 angstroms, with approximately 2000 angstroms being preferred. This patch will serve as a foundation for the first (lower) coil element and will insulate the coil element from the substrate. A via is etched to allow electrical connection to the first coil layer.

Referring next to FIG. 3, there is shown the fabrication of FIG. 2 wherein a first planar coil element has been formed on the patch by a plating process. The planarity of the coil refers to the horizontal plane in which the coil is wound. The coil windings (30) are shown in cross-section and it is recognized that the coil is a continuous, substantially spiral winding of a conducting material such as copper and is formed by a plating process. A portion of the coil winding extends beyond the rear of the pole structure and is not shown here. In this embodiment, the winding cross-sections are approximately rectangular in shape and of horizontal dimension between approximately 0.5 and 2.5 microns and of vertical dimension between approximately 1.0 and 2.5 microns. The large vertical dimension is a novel aspect of the method and provides the coil with a lowered resistance.

Referring next to FIG. 4, there is shown the fabrication of FIG. 3, wherein two pole portions have been formed, by plating, on the lower pole. A front portion (40) will form a first part of the pole tip and a rear portion (42) will form a first part of the back-gap whereat the upper and lower pole pieces will eventually be joined. These pieces are preferably formed of magnetic material such as CoNiFe and they are formed, by plating, to a thickness between approximately 1.0 and 2.5 microns. It is understood that a seed layer will be required for the plating, but this layer is not shown.

Figure 5:
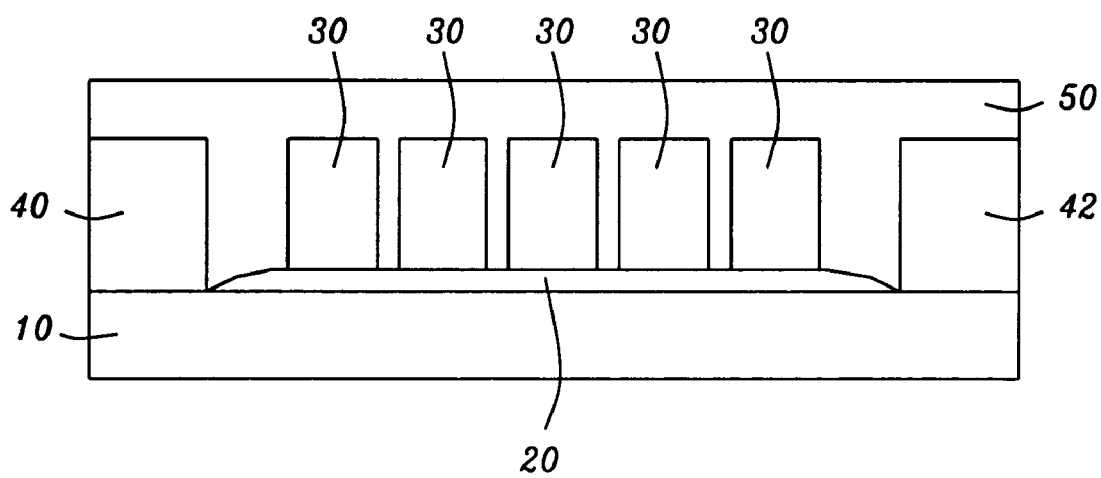
FIG. 5 shows, schematically, a layer of insulation covering the first coil layer.

Referring next to FIG. 5, there is shown, schematically, the formation of a blanket gap-filling insulator coating (50) over the pole tip (40), back-gap (42) and exposed surfaces of the first coil layer windings (30). The coating, which is preferably a coating of dielectric material such as photoresist, is subsequently thermally processed (baking) to harden and strengthen it. The coating, as is illustratred, covers the pole tip and back-gap pieces and the upper winding surfaces of the coil element and fills the gaps between the coil windings and between the windings and the pole pieces.

Figure 6:
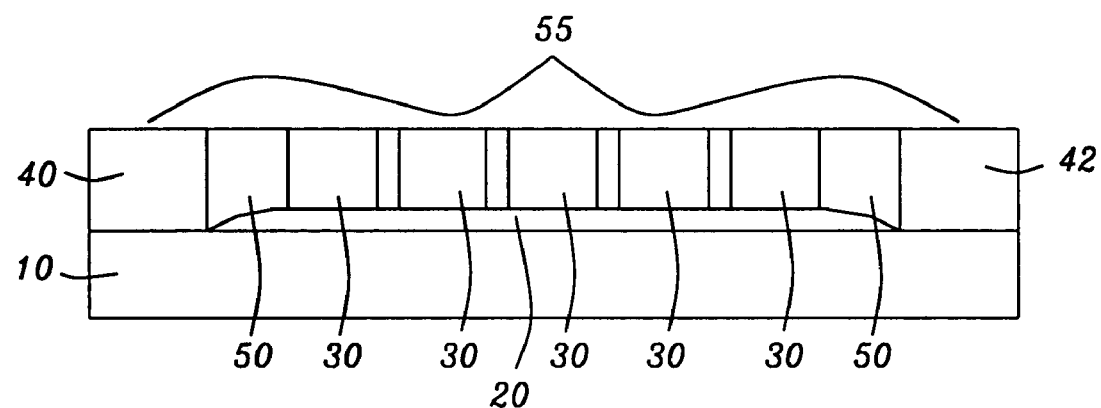
FIG. 6 shows, schematically, the upper surface of the pole, the first coil layer and the insulation layer having been polished by CMP to form a planar surface and to have the proper vertical dimensions.

Referring next to FIG. 6, there is shown the fabrication of FIG. 5, wherein the height of the upper surface of the insulator coating (50) has been reduced by the method of CMP and a common upper planar surface (55) has been established that includes the upper surfaces of the insulator, the exposed coil windings (30) and the pole and back-gap pieces (40), (42). The height of the coil windings has now been reduced to between approximately 1.0 and 2.5 microns. This CMP, which polishes the upper surface down to the upper surfaces of the coil windings, will allow the formation of an upper coil layer with a minimum of space being lost between the two layers.

Figure 7:
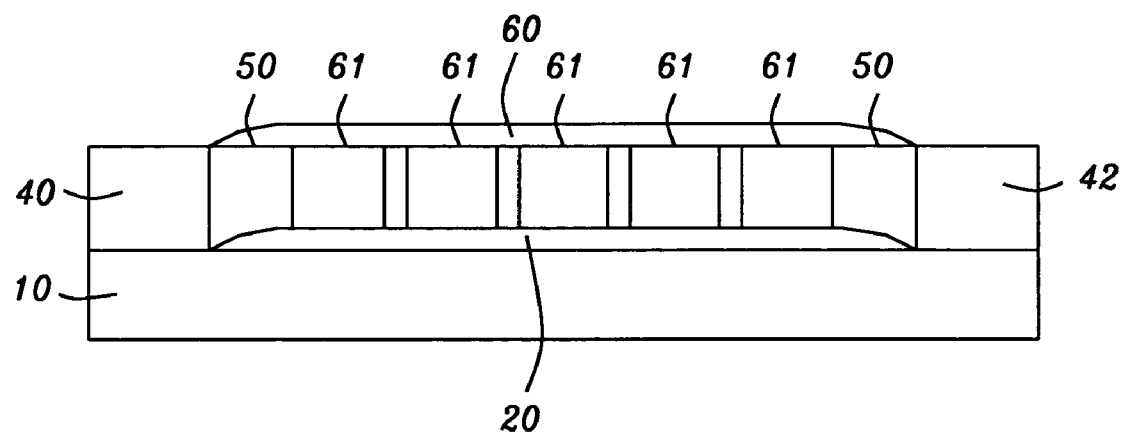
FIG. 7 shows, schematically, the formation of a second alumina patch on the planar polished surface, on which patch will be formed a second coil layer.

Referring next to FIG. 7, there is shown, schematically, the formation of a second alumina patch layer (60) to a height of between approximately 1000 and 3000 angstroms with approximately 2000 angstroms being preferred. This patch layer provides the necessary insulation between the planarized upper surfaces of the lower coil (61) and the lower surfaces of the upper coil about to be formed. A set of vias (not shown) allowing the upper coil element to be electrically connected to the lower coil element will also be formed at this time.

Figure 8:
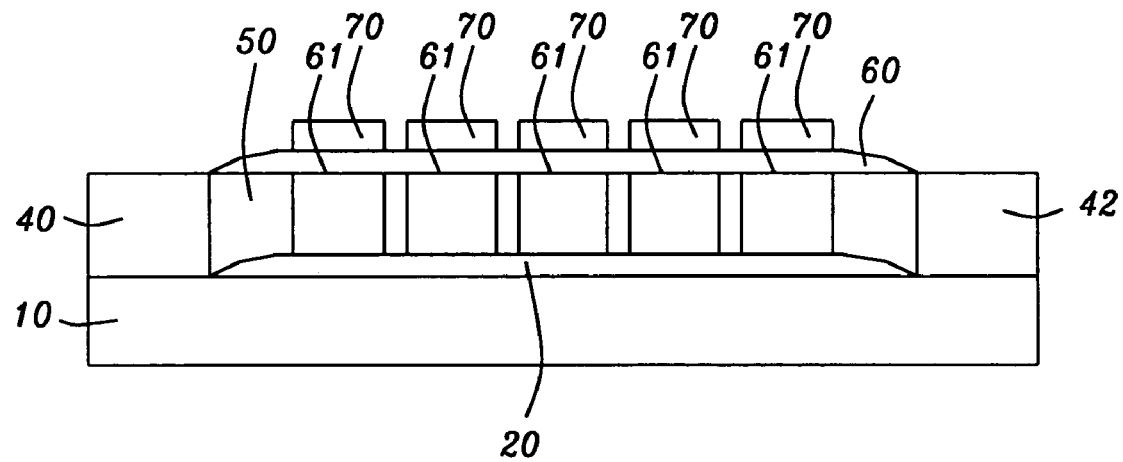
FIG. 8 shows, schematically, the formation of a second coil layer, whose windings have a reduced cross-sectional area as compared with that of the first coil layer.

Referring next to FIG. 8, there is shown the fabrication of FIG. 7 wherein a second, upper planar coil element (70) has been formed, by plating, over the second alumina patch layer (60) and is insulated, thereby, from upper coil winding surfaces (61) of the lower coil. The plane of the second coil element is, thereby, disposed parallel to and vertically above the plane of the first coil element. This second coil element, like the first coil element, is formed of a conducting material such as copper and it is formed with cross-sectional dimensions of between approximately 1.0 and 2.5 microns in height and approximately 0.5 and 2.5 microns in width. The height of the second element, however, is expected to be substantially less than that of the first element. The first and second coil elements are conductively connected through vias (not shown herein) so that they form a continuous coil.

Figure 9:
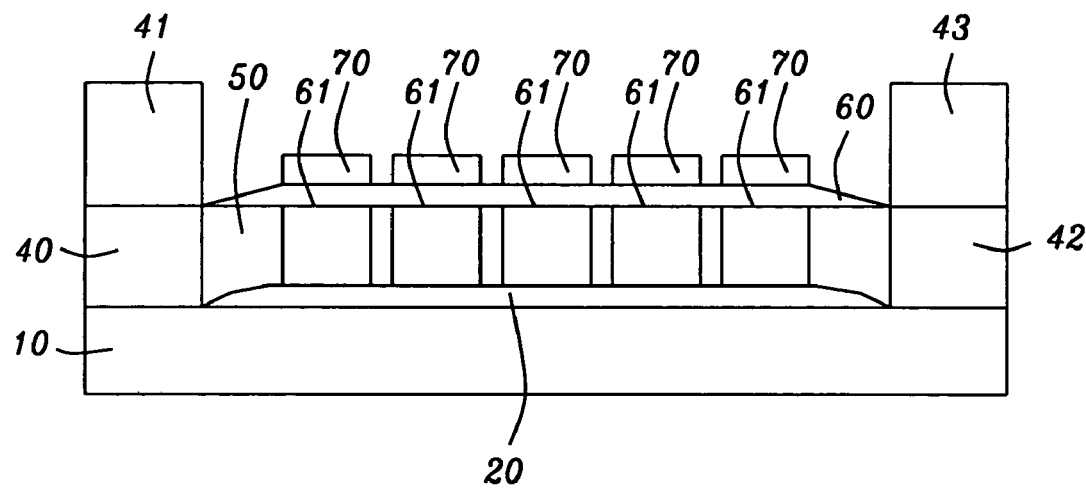
FIG. 9 shows, schematically, the formation of a second portion of the lower pole piece.

Referring next to FIG. 9, there is shown the fabrication of FIG. 8 wherein a second pole tip layer (41) and a second back-gap layer (43) have been formed, by plating, respectively, on the first pole tip layer (40) and the first back-gap layer (42). These layers are preferably formed of a magnetic material such as CoNiFe to a thickness between approximately 1.0 and 2.0 microns and they extend vertically above the plane of the second coil layer.

Figure 10:
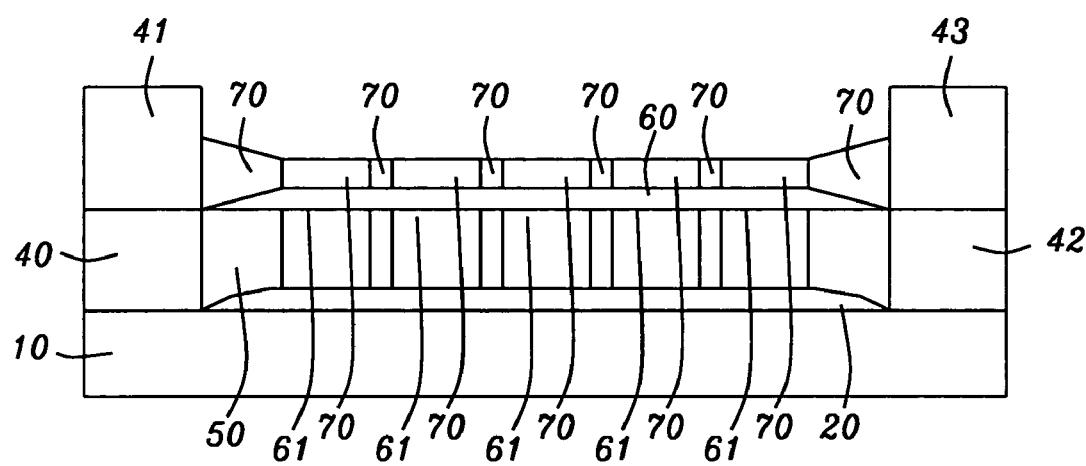
FIG. 10 shows, schematically, the formation of a patterned insulation layer surrounding the second coil layer.

Referring next to FIG. 10, there is shown schematically the fabrication of FIG. 9 with the addition of a second layer of photoresist insulation (70) formed over the second coil layer, which is patterned as shown and thermally processed for hardening.

Figure 11:
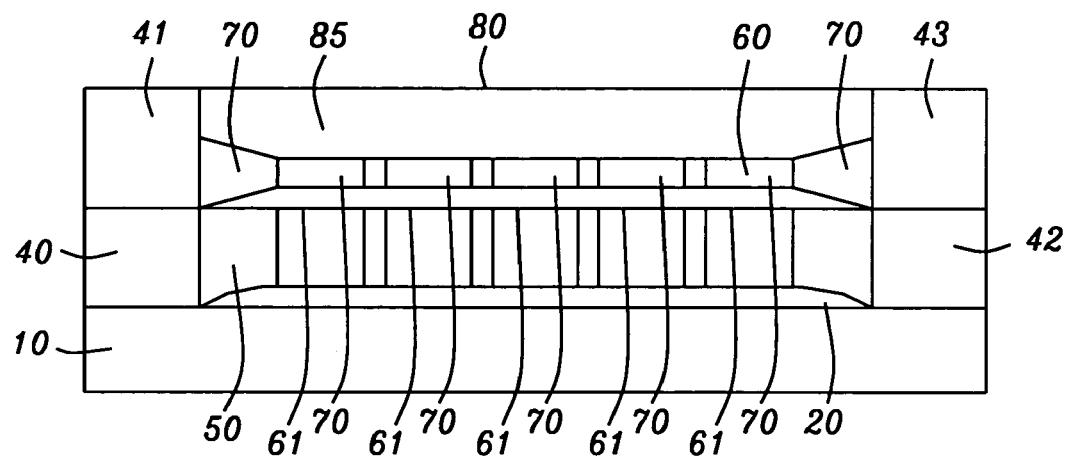
FIG. 11 shows, schematically, the planarization of the upper surface of the fabrication.

Referring next to FIG. 11, there is shown a third layer of insulation (80), which is a layer of alumina (85) formed over the second layer (70) of photoresist insulation and planarized by CMP to form a common planar surface (80) with the second pole tip layer (41) and the second back gap layer (43).

Figure 12:
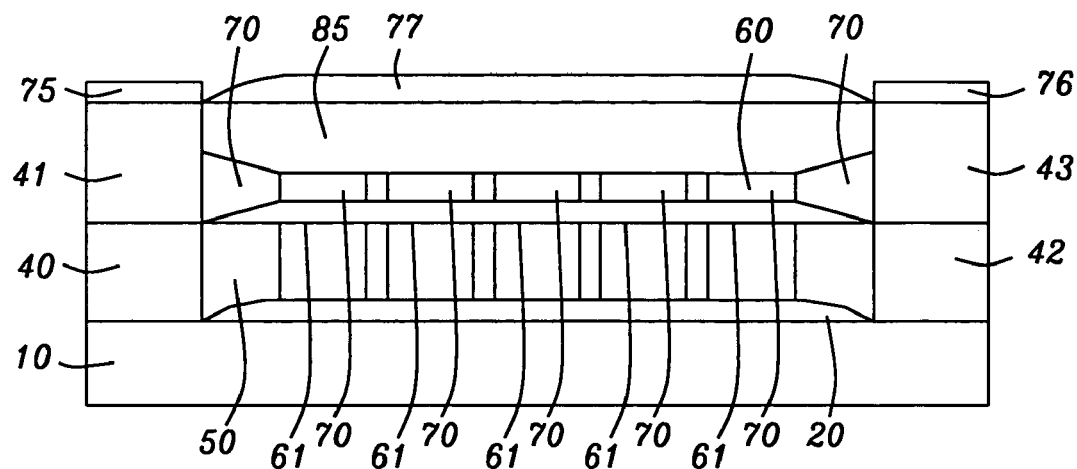
FIG. 12 shows, schematically, the seed formation for a high magnetic moment and a PIS formation.

Referring next to FIG. 12, there is shown, schematically, the fabrication of FIG. 11 with the addition of seed layer formation (75) on the second pole tip piece (41) and seed layer formation (76) on the second back-gap piece (43). The purpose of the seed layer is to improve the magnetic properties of the subsequently plated pole material. Additional layers of alumina may also be formed (77) to provide support for a write gap layer (next figure).

Figure 13:
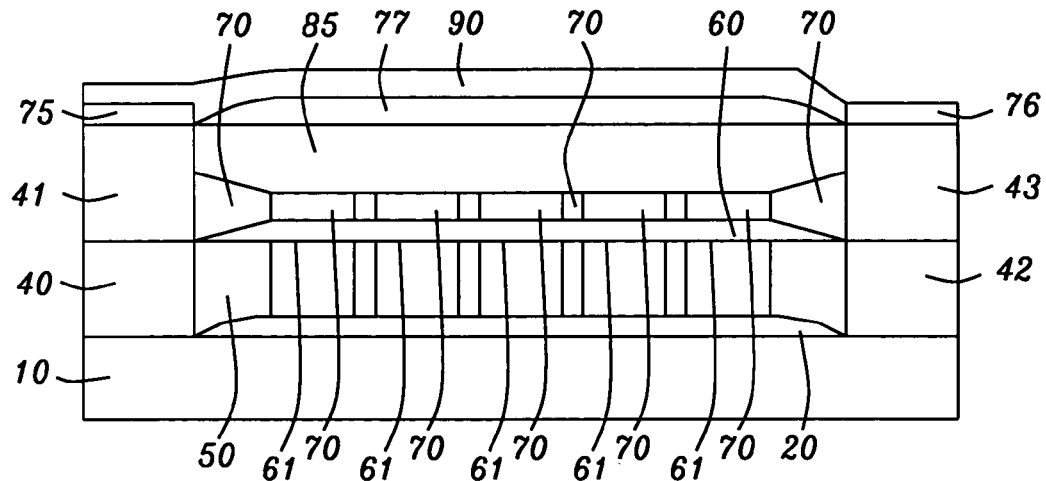
FIG. 13 shows, schematically, the formation of a write-gap layer.

Referring next to FIG. 13, there is shown the fabrication of FIG. 12 with the additional formation of a write-gap layer (90) over the upper surface, but not extending rearward to cover the seed layer (76) on the upper surface of the second back-gap piece (43). The write gap layer is preferably a layer of Ru formed to a thickness between approximately 700 and 1500 angstroms.

Figure 14:
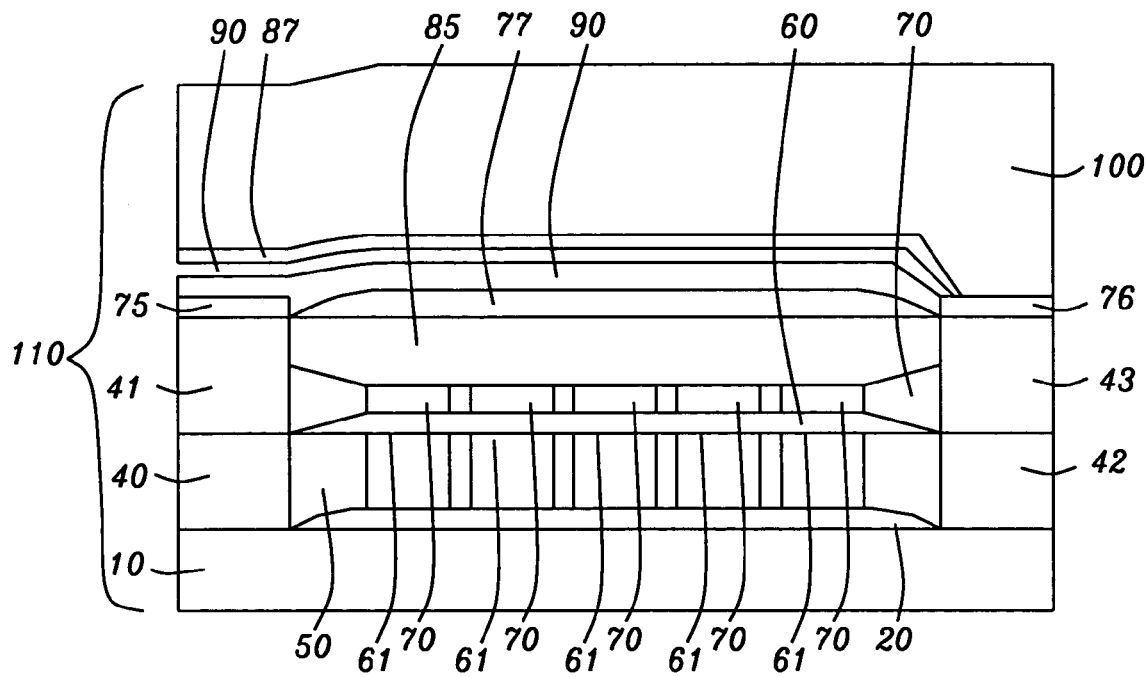
FIG. 14 shows, schematically, the formation of the upper pole piece.

Referring finally to FIG. 14, there is shown, schematically, the fabrication of FIG. 13 wherein a seed layer (85) has been formed over the write gap layer (90). This seed layer is a layer of CoFeN formed to a thickness between approximately 2000 and 5000 angstroms. An upper pole piece (100) has then been formed on this seed layer. The upper pole piece is preferably a layer of high magnetic moment material, such as CoNiFe, and is formed to a thickness between approximately 1.0 and 2.0 microns. Subsequent to this upper pole piece formation, the fabrication is trimmed to meet the desired critical dimensions. As can be seen in the figure, the front surfaces of the upper pole piece, the write gap layer, the pole tip and the lower pole piece, form an air bearing surface plane (110) for the completed write head.

As is understood by a person skilled in the art, the preferred embodiment and examples of the present invention are illustrative of the present invention rather than limiting of it. Revisions and modifications may be made to processes, structures and dimensions through which is formed a planar inductive-type magnetic write head with reduced resistance in accord with the preferred embodiment of the present invention while still providing such a planar inductive-type magnetic write head with reduced resistance formed in accord with the present invention and appended claims.

What is claimed is:

1. An inductive-type magnetic write head with a two-element coil and reduced coil resistance comprising:

a lower magnetic pole formed of magnetic material;

a pole tip formed of magnetic material on a front portion of said lower magnetic pole and extending vertically above said pole;

a back-gap element formed of magnetic material on a rear portion of said lower magnetic pole and extending vertically above said pole;

an upper magnetic pole formed of magnetic material and extending horizontally between said back-gap element and said pole tip, said upper pole having a rear portion contacting an upper surface of said back-gap element and a front portion extending over said pole tip and separated from said pole tip by a write gap layer;

a dual element conducting coil formed above said lower magnetic pole, between said pole tip and said back-gap element and below said write gap layer, said coil comprising two horizontal planar coil elements vertically disposed above each other and vertically separated from each other by an insulating patch layer of minimal thickness and wherein the windings of the lower coil element have a greater cross-sectional area than the windings of the upper coil element to provide a reduced coil resistance.

2. The write head of claim 1 wherein said coil elements are vertically separated by an alumina patch layer of thickness between approximately 1000 and 3000 angstroms.

3. The write head of claim 1 wherein the height of the coil windings of the lower coil are between approximately 1.0 and 2.5 microns.

4. The write head of claim 1 wherein the width of both the first and second coil element windings is between approximately 0.5 and 2.0 microns.

5. A method of forming an inductive-type magnetic write head with a two element coil and reduced coil resistance comprising:

providing a lower magnetic pole piece having a front end and a rear end;

planarizing an upper surface of said pole piece;

forming on said planarized pole piece a first alumina patch layer;

forming, by plating, a first conductive coil element on said patch layer, the windings of said first coil element having an initial cross-sectional height and a width;

forming a first pole tip layer on the upper surface of the front end of said substrate and a first back-gap layer on the upper surface of the rear end of said substrate, said first coil element now being disposed between said first tip layer and first back-gap layer;

forming a first blanket photoresist layer over said first coil element and said first pole tip and back-gap layers, said layer filling gaps between the windings of said coil element and between said coil element and said first pole-tip layer and first back-gap layer and hardening said layer by a thermal process;

forming, by chemical-mechanical polishing, a common horizontal planar surface containing upper surfaces of said first coil element windings, said first pole-tip layer and said first back-gap layer and the insulation layer therebetween; thereby reducing the initial height of said coil element windings to a final height;

forming on said common planar surface a second alumina patch layer, said layer being of minimal thickness and being disposed between the upper surfaces of said first pole-tip and back-gap layers;

forming, by plating, on said second patch layer a second coil element, the windings thereof having a second cross-sectional height and width and said second coil element being in electrical contact with said first coil element to form a continuous two-element coil;

forming a second pole tip layer on the upper surface of the first pole tip layer and a second back gap layer on the upper surface of the first back gap layer;

forming a second photoresist layer over said second coil element, said layer filling gaps between windings of said second coil element and between said second coil element and said second pole tip and back-gap layers and hardening said layer by a thermal process;

forming, by chemical-mechanical polishing, a common horizontal planar surface containing upper surfaces of said second coil element windings and the insulation layer therebetween;

forming a third alumina layer on said second horizontal planar surface, the upper surface of said layer having substantially the same height as the upper surfaces of said second pole tip and back-gap layers;

planarizing said second alumina layer forming, thereby, a common horizontal plane containing the upper surface of said alumina layer and upper surfaces of said second pole tip and back-gap layers;

forming a write gap layer on said plane, the write gap layer not covering the upper surface of the back gap layer;

forming an upper pole piece extending horizontally from said back-gap layer to said pole tip layer, said pole piece being formed on said back-gap layer and said write gap layer.

6. The method of claim 5 wherein the first final height of said first coil element windings is between approximately 2.5 and 1.0 microns.

7. The method of claim 5 wherein said alumina patch layers are formed to a thickness between approximately 1000 and 3000 angstroms.

* * * * *